United States Patent [19]
Stuntz et al.

[11] Patent Number: 6,039,028
[45] Date of Patent: Mar. 21, 2000

[54] ACTIVE ENGINE SPEED PULSATION DAMPING

[75] Inventors: Ross Maxwell Stuntz, Birmingham; Alexander Timofeevich Zaremba, Dearborn Heights, both of Mich.

[73] Assignee: Ford Global Technologies, Inc., Dearborn, Mich.

[21] Appl. No.: 09/231,879

[22] Filed: Jan. 14, 1999

[51] Int. Cl.[7] .................................................. F02D 43/00
[52] U.S. Cl. ...................... 123/436; 123/339.19; 123/352
[58] Field of Search .............................. 123/436, 339.14, 123/339.19, 339.2, 350, 352, 192.1; 701/111

[56] References Cited

U.S. PATENT DOCUMENTS

| | | | |
|---|---|---|---|
| 4,328,775 | 5/1982 | Ironside | 123/339.19 |
| 4,492,195 | 1/1985 | Takahashi et al. | 123/339.11 |
| 4,688,535 | 8/1987 | Kuttner et al. | 123/436 |
| 4,699,097 | 10/1987 | Tanaka et al. | 123/192.1 |
| 4,860,707 | 8/1989 | Ohata | 123/339.2 |
| 4,922,869 | 5/1990 | Kadomukai et al. | 123/192.1 |
| 4,977,508 | 12/1990 | Tanaka et al. | 701/111 |
| 4,995,139 | 2/1991 | Suzuki | 73/116 |
| 5,020,491 | 6/1991 | Mashino | 123/192.1 |
| 5,033,425 | 7/1991 | Kadomukai et al. | 123/192.1 |
| 5,109,815 | 5/1992 | Maeda et al. | 123/192.1 |
| 5,111,784 | 5/1992 | Kuriyama et al. | 123/192.1 |
| 5,185,543 | 2/1993 | Tebbe | 310/51 |
| 5,186,136 | 2/1993 | Kadomukai et al. | 123/192.1 |
| 5,249,558 | 10/1993 | Imamura | 123/339.2 |
| 5,497,741 | 3/1996 | Tashiro et al. | 123/192.1 |
| 5,537,967 | 7/1996 | Tashiro et al. | 123/192.1 |
| 5,740,045 | 4/1998 | Livshiz et al. | 701/101 |

OTHER PUBLICATIONS

Paper No. 92–1175—Vehicle Idling Vibration Reduction Using Electric Machine Active Torque Control; by Kadomukai et al; JSME Proceedings (C–Editorial) vol. 59 No. 560 (1993–4).

*Primary Examiner*—Willis R. Wolfe
*Assistant Examiner*—Hieu T. Vo
*Attorney, Agent, or Firm*—Mark S. Sparschu

[57] ABSTRACT

A method and system for reducing pulsations in the rotational speed of an engine in accordance with one embodiment of the present invention are disclosed. Torque applied by a supplemental torque source includes a component derived by pure feedback engine speed control and a learning feedforward component. The feedforward component predicts the oscillatory components in the torque generated by the engine.

14 Claims, 2 Drawing Sheets

ACTIVE ENGINE SPEED PULSATION DAMPING

BACKGROUND OF THE INVENTION

1. Field of the Invention

The present invention relates to rotational speed control of internal combustion engines, and more particularly to methods and systems for reducing pulsations in the rotational speed of such engines.

2. Description of the Related Art

In a motor vehicle, pulsations in the rotational speed of the engine, particularly at engine idle, can be a source of customer dissatisfaction. In such a vehicle, an engine controller will (among its other engine control duties) attempt to control the idle speed of the engine to a predetermined target value. However, the torque produced by the engine is a complicated non-linear function of many variables, including the rotational position of the engine. Thus, pulsations in idle speed about the predetermined target value occur despite attempts by the engine controller to control the idle speed to the target value.

Using an electrical machine as a supplemental torque source to improve idle speed control and reduce engine speed pulsations is known and has been investigated in recent years. For example, in "Vehicle Idling Variation Reduction Using Electric Machine Active Torque Control", *Japan Society of Mechanical Engineers Proceedings*, volume 59, no. 560 (1993-4), a method is presented for estimating angular velocity and angular acceleration of the engine and controlling a supplemental torque source to provide torque which cancels the torque variations of the engine. However, such estimates, particularly the estimate of angular acceleration, can be very computationally complex and can introduce sensitivity to noise.

A method and system whereby a supplemental torque source reduces engine speed pulsations in a very effective and computationally efficient manner will provide considerable advantages. When applied in a motor vehicle at idle, such a system and method will improve customer satisfaction with the idle quality of his vehicle.

SUMMARY OF THE INVENTION

The present invention provides a method for reducing rotational speed pulsations in an engine. The method comprises generating a first supplemental torque term, the value of the first supplemental torque term being a linear function of a present difference between a target engine rotational speed and an actual engine rotational speed. The method also includes generating a second supplemental torque term, the present value of the second supplemental torque term being a function of the second supplemental torque term calculated when the engine was at a previous rotational position and the first supplemental torque term calculated when the engine was at that previous rotational position. Further, the method comprises applying a supplemental torque to the engine in addition to the torque generated by the engine, the supplemental torque comprising a combination of the present value of the first supplemental torque term and the present value of the second supplemental torque term, the supplemental torque reducing rotational speed pulsations of the engine.

The present invention further provides a method for reducing rotational speed pulsations in an engine, the method comprising generating a first supplemental torque term, the present value of the first supplemental torque term being a linear function of a present difference between a target engine rotational speed and an actual engine rotational speed. The method additionally includes generating a second supplemental torque term, the second supplemental torque term being defined as follows:

$$u_a^{i+1}(q) = u_a^i(q) - \beta u_f^i(q),$$

wherein $u_a$ is the second supplemental torque term, $u_f$ is the first supplemental torque term, q is a rotational position of the engine, i is an integer representing a respective rotation of the engine, and $\beta$ is a constant. Further, the method includes applying a supplemental torque to the engine, the supplemental torque u being defined as follows:

$$u = u_f - u_a,$$

where $u_f$ is the first supplemental torque term.

The present invention also provides a system adapted to reduce rotational speed pulsations in an engine. The system comprises means for generating a first supplemental torque term, the value of the first supplemental torque term being a linear function of a present difference between a target engine rotational speed and an actual engine rotational speed. The system further comprises means for generating a second supplemental torque term, the present value of the second supplemental torque term being a function of the second supplemental torque term calculated when the engine was at a previous rotational position and the first supplemental torque term calculated when the engine was at the previous rotational position. In addition, the system includes means for applying a supplemental torque to the engine in addition to the torque generated by the engine, the supplemental torque comprising a combination of the present value of the first supplemental torque term and the present value of the second supplemental torque term, the supplemental torque reducing rotational speed pulsations of the engine.

Systems according to the present invention can substantially reduce the pulsations in engine speed. In reducing such pulsations, particularly at engine idle, the present invention can provide considerable advantages in customer satisfaction.

DETAILED DESCRIPTION OF THE PREFERRED EMBODIMENT

Figure 1:
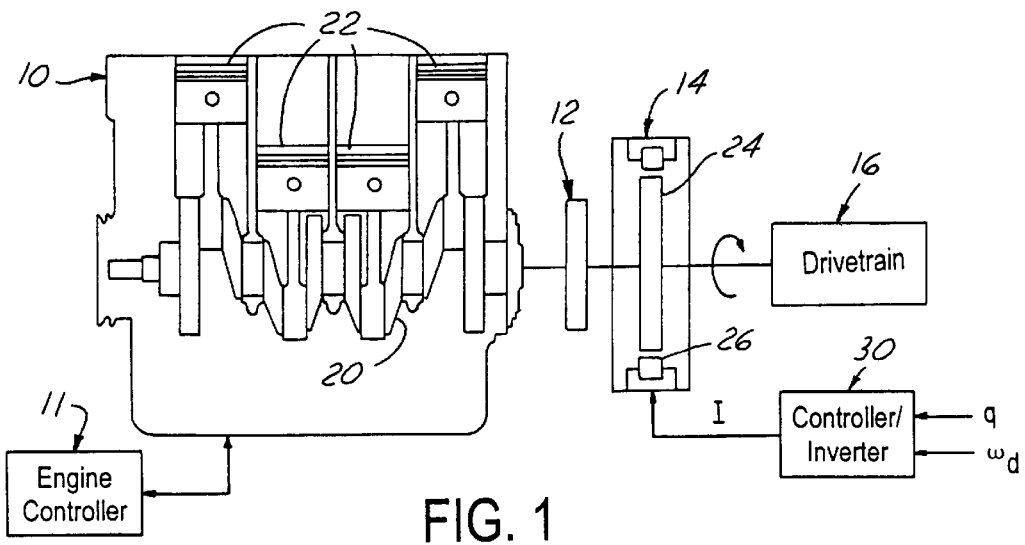
FIG. 1 is an illustration of vehicle system including an internal combustion engine and a starter/alternator, a supplemental torque source.

Refer first to FIG. 1. There is illustrated a vehicle system including an internal combustion engine 10, an engine controller 11, a flywheel 12, a starter/alternator 14 and a drivetrain 16. Internal combustion engine 10 includes a crankshaft 20 which is rotated by a plurality of pistons 22. Flywheel 12 is coupled for rotation with crankshaft 20. Engine controller 11 performs the typical engine control functions of a controller for an internal combustion engine, including idle speed control.

Also coupled for rotation with crankshaft 20 and flywheel 12 is the rotor 24 of starter/alternator 14. Starter/alternator 14 is preferably a multiphase AC induction machine also having a stator 26. Starter/alternator 14 can also be based on other electrical machine technology, such as permanent magnet brushless motor technology. Drivetrain 16 includes a clutch, transmission and differential, for transmitting drive torque from engine 10 to the drive wheels of the vehicle.

Coupled to starter/alternator 14 is a controller/inverter 30 which controls starter/alternator 14. Controller/inverter 30 is preferably a microprocessor-based device having sufficient microcomputer resources (throughput, inputs, outputs, memory and the like) to perform the control of starter/alternator 14. Controller/inverter 30 also preferably contains semiconductor switches to perform the inverter function which will provide the AC voltages to the stator of starter/alternator 14 in order to drive rotor 24. Controller/inverter 30 has access via an appropriate sensor to actual engine rotational position q and via appropriate communication with engine controller 11 to target idle speed $\omega_d$ of engine 10. Controller/inverter 30 provides phase currents (collectively referred to by the variable I in FIG. 1) to starter/alternator 14.

In beginning the analysis of the system of FIG. 1, we first note that:

$$\dot{q} = \omega \qquad (1)$$

and $$J\dot{\omega} + K_f \omega = u + T_e(q), \qquad (2)$$

where q and $\omega$ are crankshaft rotational position and speed, respectively, J is the lumped inertia of flywheel 12, rotor 24 and engine 10, and $K_f$ is the effective damping coefficient.

The engine crankshaft torque $T_e$ is a complicated nonlinear function of crankshaft angle and system parameters and is considered here to be an external disturbance. If we consider the engine processes at steady state, the engine crankshaft torque can be characterized as a cyclic function $T_e(q)$ in the crankshaft angle domain.

The supplemental control torque u applied by induction starter/alternator 14 also has complicated nonlinear dynamics. However, the principles of induction machine control are well understood, and several effective methods for controlling induction machines are well known. For the purposes of this discussion, we will assume that starter/alternator 14 can provide the torque required to perform the functions ascribed herein. Detailed dynamics of starter/alternator 14 and its control are beyond the scope of this disclosure.

If we transform the system equations (2) to the crank angle domain q, $$J\omega \frac{d\omega}{dq} + K_f \omega = u + T_e(q). \qquad (3)$$

This model is a good choice, as engine torque is a function of crank angle and crankshaft speed is typically sampled at discrete crank angle intervals.

For our system, we consider the problem of actively damping crankshaft pulsations about a desired constant idle speed $\omega = \omega_d$. Linearizing the system of equation (3) around desired idle speed $\omega_d$, we find that $$J\omega_d \frac{d\tilde{\omega}}{dq} + K_f \tilde{\omega} = u - K_f \omega_d + T_e(q), \qquad (4)$$

where $\tilde{\omega} = \omega - \omega_d$ is the crankshaft speed pulsation function.

At engine idle, engine controller 11 regulates engine torque such that the average (or DC) components of engine torque compensate steady-state load and damping, and equation (4) can be rewritten as:

$$J\omega_d \frac{d\tilde{\omega}}{dq} + K_f \tilde{\omega} = u + \tilde{T}_e(q), \qquad (5)$$

where $$\tilde{T}_e = T_e - K_f \omega_d$$

represents the time-varying (or AC) components of the engine torque. From this point forward, we will omit the tilde and consider $T_e(q)$ as only having AC components.

Equation (5) defines crankshaft speed pulsations around the idle speed $\omega_d$ at each crankshaft rotation under a periodic disturbance $T_e(q)$ having a zero average over a period of engine rotation. We will also assume that crankshaft speed pulsations under the periodic torque disturbance and control are close to steady-state and that we can use the following initial conditions at the beginning and end of each crankshaft rotation:

$$\omega_i(2\pi) = \omega_i(0) = 0, \qquad (6)$$

where i is an integer representing the sequential number of the crankshaft rotation.

The controller design problem is thus to find a control law u(t) for the supplemental torque source (starter/alternator 14) such that the speed of crankshaft 20 converges to the desired idle speed, i.e., $$\lim_{i \to \infty} \omega_i(q) = \omega_d. \qquad (7)$$

The controller we select comprises a linear feedback control $u_f$ and a learning feedforward term $u_a$ such that $$u = u_f - u_a, \qquad (8)$$

where $$u_f = -\alpha \tilde{\omega} \qquad (9)$$

with $\alpha > 0$ being a positive feedback gain. Controller/inverter 30 then provides phase currents I to starter/alternator 14 such that starter/alternator 14 generates the desired torque u. The learning feedforward term $u_a$ predicts the AC components of the engine torque and is preferably computed at each crankshaft rotation according to the learning rule to be discussed below.

Substituting equations (8) and (9) into equation (4) yields $$M_d \frac{d\tilde{\omega}}{dq} + K_f \tilde{\omega} = -\alpha \tilde{\omega} - u_a + T_e(q), \tag{10}$$

where $M_d = J\omega_d$ is used to define the kinetic momentum of the system at the desired idle speed.

Figure 2:
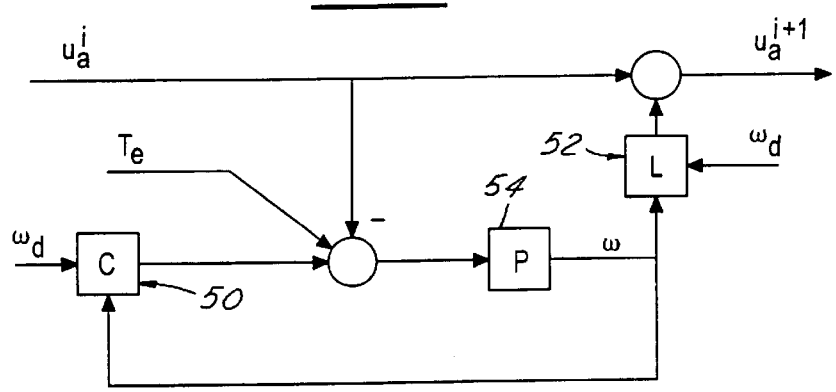
FIG. 2 is a block diagram of the control effected according to one embodiment of the present invention.

Refer now to FIG. 2. The learning control scheme for the system described by equation (10) can be represented in block diagram as shown there, where C (at block 50) is the feedback controller of equation (10), L (at block 52) is the learning controller, $P=1/(M_d s+K_f)$ (at block 54) is the plant model, $\omega$ is the actual crankshaft speed signal, $\omega_d$ is the desired crankshaft idle speed and $T_e$ represents the AC components of the engine torque. The learning operator compares actual and desired crankshaft speed signals and updates the learning function $u_i(q)$ calculated on the ith crankshaft rotation to $u_{i+1}(q)$. The functions of blocks 50 and 52 are performed by controller/inverter 30.

For a properly designed learning scheme, the learned torque converges to $T_e$, the AC components of the engine torque, so those AC components can be compensated for by the supplemental torque source (i.e., starter/alternator 14). Ideally, a gradient type learning rule can be applied, as follows:

$$u_a^{i+1}(q) = u_a^i(q) + \beta(-u_a^i(q) + T_e(q)), \tag{11}$$

where $\beta$ is a training factor. The learning process of equation (11) converges for $0<\beta<2$, and for $\beta=1$ it converges after one iteration.

However, $T_e(q)$ is an unknown, so we cannot directly use equation (11) as a learning rule. But, we know that at the beginning of the control process the feedback supplemental torque term plays the major role in damping crankshaft speed pulsations. Thus, if we replace the bracketed terms in equation (11) with the feedback control term, $$u_a^{i+1}(q) = u_a^i(q) - \beta u_f^i(q), \tag{12}$$

where information about the feedback term $u_f$ on the ith rotation is used to update the learning feedforward term $u_a$ on the (i+1)st rotation.

It can be proven that the idle speed error will converge to zero if the training factor $\beta$ is selected such that $$0 < \beta < 2 + \frac{2K_f}{\alpha}. \tag{13}$$

Figure 3A:
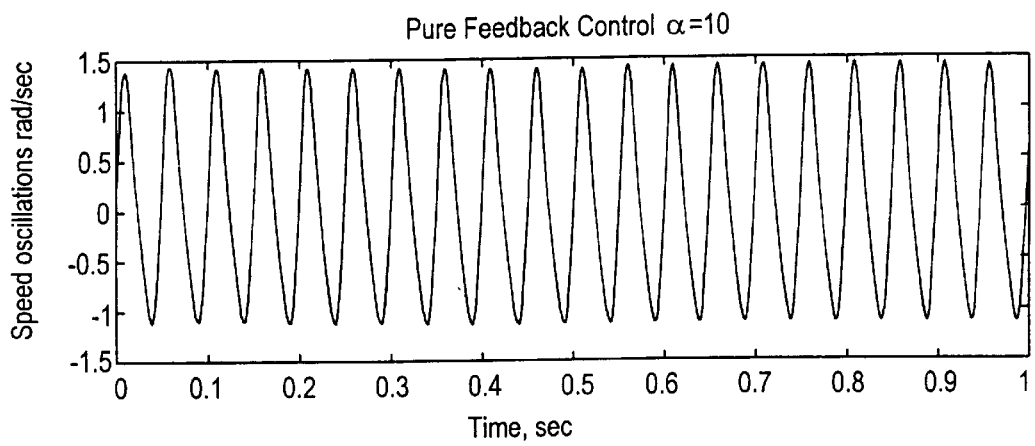
FIG. 3A is a plot which illustrates engine speed pulsations in a system which employs a supplemental torque source using only feedback engine speed control to control the supplemental torque source.
Figure 3B:
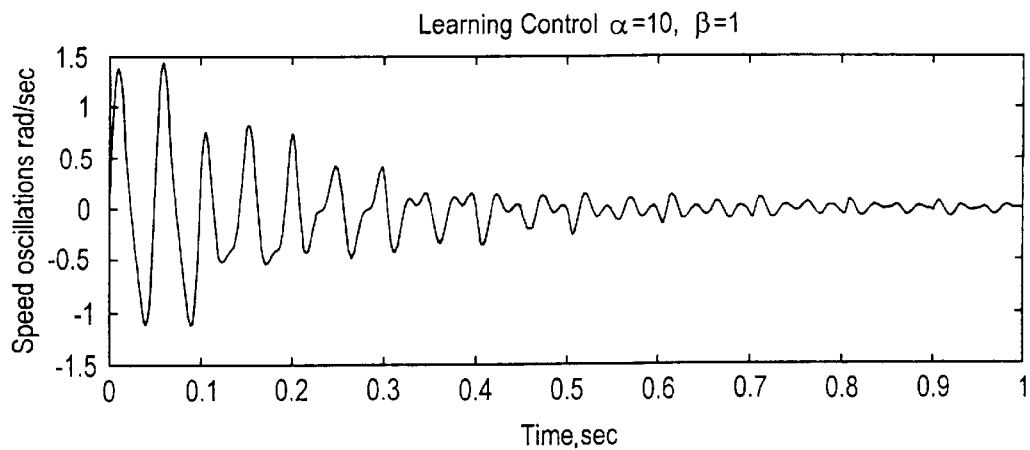
FIG. 3B is a plot which illustrates engine speed pulsations in a system according to the embodiment of the present invention disclosed herein.

Refer now to FIGS. 3A and 3B. In FIG. 3A, simulation results showing idle speed pulsations with a supplemental torque source controlled with pure feedback control with gain $\alpha=10$ are illustrated. The pulsation of idle speed is apparent. FIG. 3B, then, shows that with the learning control defined by equations (8), (9) and (12), idle speed pulsations quickly converge to nearly zero amplitude. (In FIGS. 3A and 3B, the following system parameters were used: J=0.04 kg-m$^2$, $K_f=0.05$ kg-m$^2$/sec and $\omega_d=20\pi$ rad/sec. However, it has been demonstrated that the system copes well with parameter variations.)

Figure 4:
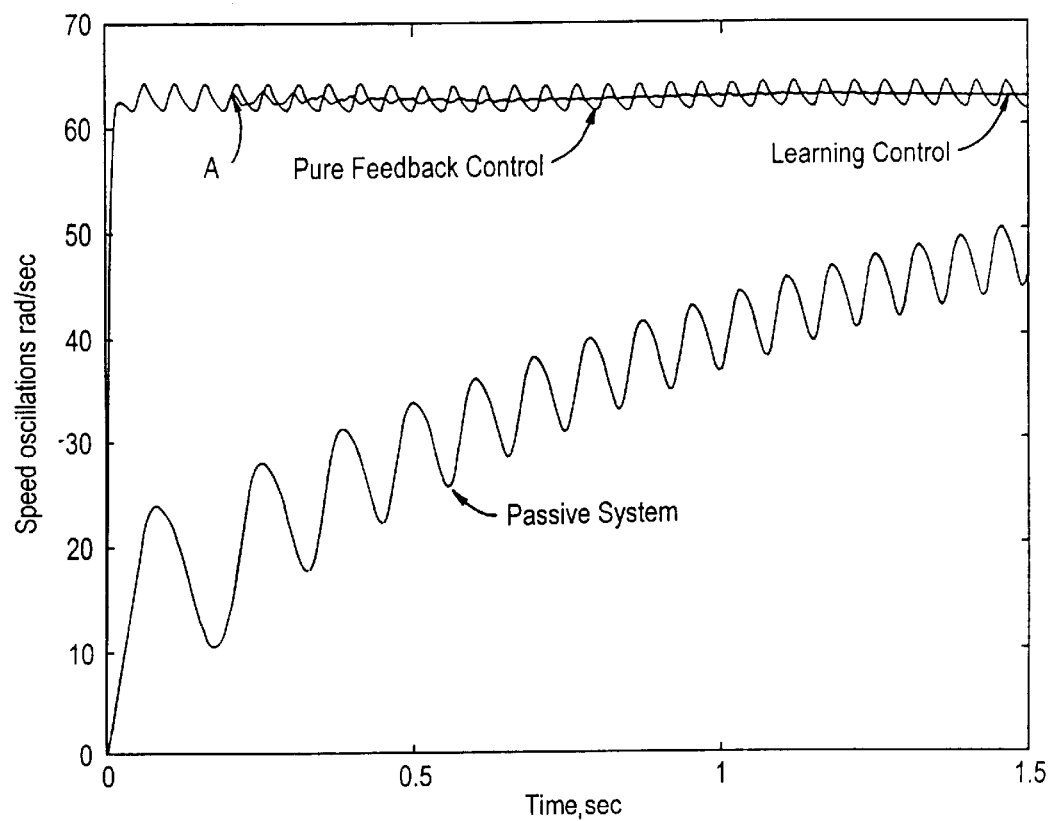
FIG. 4 is a plot which illustrates engine speed during and immediately after engine cranking using several schemes for engine speed control.

Refer now to FIG. 4. There, simulation results which compare a passive idle control system (i.e., without a supplemental torque source such as starter/alternator 14), a system having a supplemental torque source controlled by pure feedback control and a system having a supplemental torque source controlled with a learning control system according to equations (8), (9) and (12) are illustrated. (The same system parameters as for FIG. 3A and 3B were used.) After 1.5 seconds following the beginning of engine cranking, the passive system has not even reached the DC target for idle speed. The purely feedback system is still oscillating, while the learning control system has converged to nearly zero idle speed pulsation.

The learning control method described here can be modified such that pure feedback control of the supplemental torque source is used immediately after engine start. This can prevent the learning control from reproducing engine torque spikes which are present immediately upon engine start. Once the engine speed is near the desired idle speed, the learning portion of the control can be enabled. An examination of the Pure Feedback Control and Learning Control curves of FIG. 4 will show that at point "A", the idle speed pulsations under Learning Control began to diverge from Feedback Control. That divergence began when the feedforward supplemental torque term $u_a$ was enabled.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A system adapted to reduce rotational speed pulsations in an engine, said engine generating a rotational torque, said system comprising:

(a) means for generating a first supplemental torque term, the value of said first supplemental torque term being a linear function of a present difference between a target engine rotational speed and an actual engine rotational speed;

(b) means for generating a second supplemental torque term, the present value of said second supplemental torque term being a function of said second supplemental torque term calculated when said engine was at a previous rotational position and said first supplemental torque term calculated when said engine was at said previous rotational position; and (c) means for applying a supplemental torque to said engine in addition to said torque generated by said engine, said supplemental torque comprising a combination of said present value of said first supplemental torque term and said present value of said second supplemental torque term, said supplemental torque reducing rotational speed pulsations of said engine.

2. A system as recited in claim 1, further comprising means for setting said second supplemental torque term equal to zero from a beginning of engine cranking until the rotational speed of said engine is within a predetermined speed of said target engine rotational speed.

3. A system as recited in claim 1, wherein said means for generating a second supplemental torque term comprises means for applying the following calculation:

$$u_a^{i+m}(q) = u_a^i(q) - \beta u_f^i(q),$$

wherein $u_a$ is said second supplemental torque term, $u_f$ is said first supplemental torque term, q is a rotational position of said engine, i is an integer representing a respective rotation of said engine, m is an integer and β is a constant.

4. A system as recited in claim 3, wherein m=1.

5. A system as recited in claim 3, wherein means for applying a supplemental torque to said engine comprises means for applying said supplemental torque u as follows:

$$u=u_f-u_a.$$

6. A method for reducing rotational speed pulsations in an engine, comprising:
   (a) generating a first supplemental torque term, the present value of said first supplemental torque term being a linear function of a present difference between a target engine rotational speed and an actual engine rotational speed;
   (b) generating a second supplemental torque term, said second supplemental torque term being defined as follows:

$$u_a^{i+1}(q)=u_a^i(q)-\beta u_f^i(q),$$

wherein $u_a$ is said second supplemental torque term, $u_f$ is said first supplemental torque term, q is a rotational position of said engine, i is an integer representing a respective rotation of said engine, and β is a constant;
   (c) applying a supplemental torque to said engine, said supplemental torque u being defined as follows:

$$u=u_f-u_a,$$

where $u_f$ is said first supplemental torque term.

7. A method as recited in claim 6, wherein said second supplemental torque term is set equal to zero from a beginning of engine cranking until the rotational speed of said engine is within a predetermined speed of said target engine rotational speed.

8. A method for reducing rotational speed pulsations in an engine, said engine generating a rotational torque, said method comprising:
   (a) generating a first supplemental torque term, the value of said first supplemental torque term being a linear function of a present difference between a target engine rotational speed and an actual engine rotational speed;
   (b) generating a second supplemental torque term, the present value of said second supplemental torque term being a function of said second supplemental torque term calculated when said engine was at a previous rotational position and said first supplemental torque term calculated when said engine was at said previous rotational position; and
   (c) applying a supplemental torque to said engine in addition to said torque generated by said engine, said supplemental torque comprising a combination of said present value of said first supplemental torque term and said present value of said second supplemental torque term, said supplemental torque reducing rotational speed pulsations of said engine.

9. A method for reducing rotational speed pulsations in an engine as recited in claim 8, wherein said second supplemental torque term is updated once per engine revolution.

10. A method for reducing rotational speed pulsations in an engine as recited in claim 8, wherein said second supplemental torque term is set equal to zero from a beginning of engine cranking until the rotational speed of said engine is within a predetermined speed of said target engine rotational speed.

11. A method as recited in claim 8, wherein said step of generating a first supplemental torque term comprises applying the following calculation:

$$u_f=-\alpha(\omega-\omega_d),$$

wherein $u_f$ is said first supplemental torque term, α is a constant, ω is said actual engine rotational speed and $\omega_d$ is said target engine rotational speed.

12. A method as recited in claim 8, wherein said step of generating a second supplemental torque term comprises applying the following calculation:

$$u_a^{i+m}(q)=u_a^i(q)-\beta u_f^i(q),$$

wherein $u_a$ is said second supplemental torque term, $u_f$ is said first supplemental torque term, q is a rotational position of said engine, i is an integer representing a respective rotation of said engine, m is an integer and β is a constant.

13. A method as recited in claim 12, wherein m=1.

14. A method as recited in claim 12, wherein said step of applying a supplemental torque to said engine comprises applying said supplemental torque u as follows:

$$u=u_f-u_a.$$

* * * * *

UNITED STATES PATENT AND TRADEMARK OFFICE
CERTIFICATE OF CORRECTION

PATENT NO : 6,039,028
DATED : March 21, 2000
INVENTOR(S): Alexander Zaremba; Ross Stuntz It is certified that error appears in the above-identified patent and that said Letters Patent are hereby corrected as shown below:

Immediately after the Title, please insert the following Paragraph:

--This invention was made with Government support under Prime Contract No. DE-AC36-83CH10093, Subcontract No. ZCB-4-13032-02, awarded by the Department of Energy. The Government has certain rights in the invention.--

Signed and Sealed this

Third Day of April, 2001

Attest:

NICHOLAS P. GODICI

Attesting Officer     Acting Director of the United States Patent and Trademark Office